(12) United States Patent
Brown et al.

(10) Patent No.: US 10,577,053 B2
(45) Date of Patent: Mar. 3, 2020

(54) DAMPER FOR A BICYCLE COMPONENT

(71) Applicant: SRAM, LLC, Chicago, IL (US)

(72) Inventors: Joshua Brown, Chicago, IL (US); Andrew Samways, La Grange, IL (US)

(73) Assignee: SRAM, LLC, Chicago, IL (US)

( * ) Notice: Subject to any disclaimer, the term of this patent is extended or adjusted under 35 U.S.C. 154(b) by 253 days.

(21) Appl. No.: 15/614,823

(22) Filed: Jun. 6, 2017

(65) Prior Publication Data

US 2018/0346058 A1    Dec. 6, 2018

(51) Int. Cl.
*B62M 9/1248* (2010.01)
*F16F 7/06* (2006.01)
*B62M 9/126* (2010.01)

(52) U.S. Cl.
CPC .......... *B62M 9/1248* (2013.01); *B62M 9/126* (2013.01); *F16F 7/06* (2013.01)

(58) Field of Classification Search
CPC ...... B62M 9/126; B62M 9/1248; B62M 9/16; B62M 9/122; B62M 9/121
USPC ...................................... 474/80, 82
See application file for complete search history.

(56) References Cited

U.S. PATENT DOCUMENTS

| | | | | |
|---|---|---|---|---|
| 1,717,393 | A | * | 6/1929 | Loughead ............... F16D 65/00 188/251 R |
| 4,406,643 | A | * | 9/1983 | Shimano ................ B62M 9/126 474/80 |
| 4,563,167 | A | | 1/1986 | Foster |
| 5,152,720 | A | | 10/1992 | Browning et al. |
| 6,135,904 | A | * | 10/2000 | Guthrie .................. B62M 9/122 474/82 |
| 8,202,182 | B2 | | 6/2012 | Ishikawa et al. |
| 8,744,699 | B2 | | 6/2014 | Yamaguchi et al. |
| 8,852,041 | B2 | * | 10/2014 | Yamaguchi ............ B62M 9/126 474/80 |
| 8,870,692 | B2 | * | 10/2014 | Yamaguchi ............ B62M 9/126 474/80 |
| 8,870,693 | B2 | * | 10/2014 | Shahana ................ B62M 9/121 474/80 |

(Continued)

FOREIGN PATENT DOCUMENTS

| CN | 103707994 A | 4/2014 |
|---|---|---|
| DE | 102007040156 A1 | 2/2009 |

(Continued)

*Primary Examiner* — Henry Y Liu

(57) ABSTRACT

A bicycle rear derailleur has a base member mountable to a bicycle frame, a movable member movably coupled to the base member, a chain guide assembly rotatably connected to the movable member, a biasing element configured to bias the chain guide assembly in a first rotational direction relative to the movable member, and a damper device disposed between the chain guide assembly and the movable member. The damper device is operable to apply a damping force to the chain guide assembly when the chain guide assembly rotates in a second rotational direction relative to the movable member. The damper device includes a friction member having a first end and an outer annular surface. The first end is non-rotatably attached to the chain guide assembly. The outer annular surface of the friction member is in frictional engagement with an inner annular surface of the movable member.

17 Claims, 11 Drawing Sheets

(56) References Cited

U.S. PATENT DOCUMENTS

| | | | | |
|---|---|---|---|---|
| 8,900,078 B2* | 12/2014 | Yamaguchi | ........... | B62M 9/1244 474/80 |
| 9,187,149 B2* | 11/2015 | Yamaguchi | ............ | B62M 9/126 |
| 9,228,643 B2* | 1/2016 | Yamaguchi | ............ | F16H 7/1227 |
| 9,290,235 B2 | 3/2016 | Yamaguchi | | |
| 9,377,089 B2* | 6/2016 | Yamaguchi | ............ | F16H 7/0829 |
| 9,463,846 B2* | 10/2016 | Chang | .................... | B62M 9/121 |
| 9,475,547 B2* | 10/2016 | Jordan | ................. | B62M 9/1248 |
| 9,669,900 B2* | 6/2017 | Shirai | ........................ | B62M 9/16 |
| 9,751,590 B2* | 9/2017 | Shipman | ................ | B62M 9/126 |
| 9,845,134 B2* | 12/2017 | Takachi | ................ | B62M 9/121 |
| 10,189,542 B2* | 1/2019 | Wu | ....................... | B62M 9/1242 |
| 2007/0219029 A1* | 9/2007 | Turner | .................... | B62M 9/16 474/80 |
| 2008/0026890 A1* | 1/2008 | Oseto | ................... | B62M 9/1242 474/82 |
| 2008/0026891 A1* | 1/2008 | Oseto | ................... | B62M 9/1242 474/82 |
| 2009/0054183 A1* | 2/2009 | Takachi | ................. | B62M 9/121 474/80 |
| 2009/0291789 A1* | 11/2009 | Ishikawa | .............. | B62M 9/1248 474/82 |
| 2012/0083371 A1* | 4/2012 | Yamaguchi | ............ | B62M 9/126 474/80 |
| 2012/0083372 A1* | 4/2012 | Yamaguchi | ............ | B62M 9/126 474/80 |
| 2012/0142466 A1 | 6/2012 | Lin | | |
| 2012/0258827 A1 | 10/2012 | Ishikawa et al. | | |
| 2013/0090195 A1* | 4/2013 | Yamaguchi | ............ | B60T 7/102 474/80 |
| 2013/0090196 A1* | 4/2013 | Yamaguchi | ............ | B62M 9/122 474/80 |
| 2013/0203532 A1* | 8/2013 | Jordan | ................. | B62M 9/1248 474/82 |
| 2013/0288834 A1* | 10/2013 | Yamaguchi | ............ | B62M 9/126 474/80 |
| 2013/0310204 A1* | 11/2013 | Shahana | ................ | B62M 9/121 474/80 |
| 2014/0162817 A1* | 6/2014 | Yamaguchi | ............ | B62M 9/122 474/80 |
| 2014/0162818 A1* | 6/2014 | Yamaguchi | ............. | F16H 61/68 474/80 |
| 2014/0213397 A1* | 7/2014 | Yamaguchi | ............ | B62M 9/122 474/80 |
| 2014/0296009 A1* | 10/2014 | Suyama | ................. | B62M 9/16 474/80 |
| 2014/0371013 A1* | 12/2014 | Yamaguchi | .......... | B62M 9/1244 474/122 |
| 2015/0031483 A1* | 1/2015 | Yamaguchi | .......... | B62M 9/1242 474/80 |
| 2015/0072816 A1* | 3/2015 | Yamaguchi | ............. | B62M 9/16 474/113 |
| 2015/0072817 A1* | 3/2015 | Yamaguchi | ........... | F16H 7/1227 474/113 |
| 2016/0046352 A1* | 2/2016 | Shipman | ................ | B62M 9/126 474/80 |
| 2016/0304161 A1* | 10/2016 | Shirai | ...................... | B62M 9/16 |
| 2017/0113760 A1* | 4/2017 | Lin | ........................ | B62M 9/125 |
| 2017/0174289 A1* | 6/2017 | Wu | ....................... | B62M 9/1242 |

FOREIGN PATENT DOCUMENTS

| | | |
|---|---|---|
| DE | 102011114699 A1 | 4/2012 |
| DE | 202007019470 U1 | 11/2012 |
| DE | 102013001952 A1 | 8/2013 |
| JP | H02296024 A | 12/1990 |
| JP | H0544761 A | 2/1993 |
| JP | H07301272 A | 11/1995 |
| JP | H03267027 A | 11/1997 |
| JP | H1182593 A | 3/1999 |
| JP | 2008008418 A | 1/2008 |
| TW | M481882 U | 7/2014 |
| WO | 2007106867 A2 | 9/2007 |

\* cited by examiner

DAMPER FOR A BICYCLE COMPONENT

BACKGROUND

1. Field of the Disclosure

The present disclosure is generally directed to a bicycle chain tensioner, and more particularly, to a damper for a bicycle rear derailleur.

2. Description of Related Art

Bicycle rear derailleurs are well known in the art as a part of a drivetrain of a bicycle. The typical drivetrain also includes a crank assembly that is coupled to one or more sprockets. The crank assembly is operable to drive a chain that is routed or wrapped around one of the sprockets. The chain is also routed to the rear wheel of the bicycle.

Rear derailleurs are provided as a part of the drivetrain to perform two basic functions. The primary function of the rear derailleur is to selectively shift a bicycle chain of the drivetrain among a series of different diameter cogs that are attached to the rear wheel. Shifting of the bicycle chain from one cog to another at the rear wheel is done in order to change the gear ratio of the drivetrain. Another function of the rear derailleur is to apply a tension to the chain to take-up slack, as well as to maintain the desired tension, in the chain on the non-drive-side of the drivetrain.

The rear derailleur accomplishes the tensioning function by employing a chain tensioning mechanism known as a chain tensioner. The chain tensioner typically has one or two rotatable cogs or pulleys and the chain is routed or wrapped around the pulleys. The chain tensioner is connected to the main body of the rear derailleur in a manner that allows the chain tensioner to pivot relative to the main body. The chain tensioner is also biased to pivot or rotate in a direction that tensions or applies a tensioning force to the chain.

When a bicycle travels over smooth terrain, the standard rear derailleur and chain tensioner are often sufficient to maintain enough tension in the chain so that the chain does not fall off the sprockets or cogs. However, when a bicycle travels over rough terrain, the forces transmitted to the rear derailleur can cause the chain tensioner to undesirably rotate in the chain slackening direction against the biasing force applied to the chain tensioner. This creates a slack condition in the chain. A slack chain can lead to the chain slapping against the frame of the bicycle. A slack chain can also lead to the chain falling off the sprockets or cogs.

A solution to this undesirable condition is to incorporate a damping system into the chain tensioning part of the derailleur. A damping system is designed to resist and/or dampen chain tensioner rotation, particularly in the chain slackening direction. A one-way damping system is configured to resist chain tensioner rotation in the chain slackening direction while still allowing chain tensioner rotation in the chain tensioning direction, the chain tensioner rotation in the chain tensioning direction preferably with less, minimal, or no damping. The typical one-way damping systems work by using a frictional element to provide a damping force in the chain slackening direction of chain tensioner rotation, and include a one-way roller clutch to prevent the frictional element from engaging in the chain tensioning direction.

These roller clutch based friction type damping systems are relatively heavy, which runs counter to a common performance goal of reducing bicycle weight. Further, this type of friction damping system may be rather complicated in construction, requiring multiple parts and numerous manufacturing steps. One result of the complicated nature of roller clutch based friction type damping systems is that the parts are relatively expensive, which increases the cost of the rear derailleurs.

SUMMARY

In one example, a bicycle rear derailleur includes a base member mountable to a bicycle frame, a movable member movably coupled to the base member, a chain guide assembly rotatably connected to the movable member, a biasing device configured to bias the chain guide assembly in a first rotational direction relative to the movable member, and a damper device disposed between the chain guide assembly and the movable member. The movable member has an inner annular surface. The damper device is operable to apply a damping force to the chain guide assembly when the chain guide assembly rotates in a second rotational direction relative to the movable member. The second rotational direction is opposite the first rotational direction. The damper device includes a friction member. The friction member has an outer annular surface. The outer annular surface of the friction member is in frictional engagement with the inner annular surface of the movable member.

In one example, the friction member has a first end. The first end of the friction member is non-rotatably attached to the chain guide assembly.

In one example, the friction member has a second end. The second end of the friction member is circumferentially free.

In one example, the bicycle rear derailleur further includes a shaft. The chain guide assembly is rotatably connected to the movable member via the shaft. The friction member is disposed a radial distance from the shaft.

In one example, the bicycle rear derailleur further includes a sleeve. The movable member has an annular recess. The sleeve is attached to the movable member within the annular recess such that the sleeve does not rotate relative to the movable member. A surface of the sleeve forms the inner annular surface of the movable member.

In one example, the sleeve is made of a first material, and the friction member is made of a second material. The first material has a greater hardness than the second material.

In one example, the outer annular surface of the friction member is in frictional engagement with the surface of the sleeve for more than 180 degrees of the sleeve over a first arc length.

In one example, the friction member is a first friction member. The damper device further includes a second friction member. The second friction member has a first end and an outer annular surface. The first end of the second friction member is non-rotatably attached to the chain guide assembly. The outer annular surface of the second friction member is in frictional engagement with the surface of the sleeve.

In one example, the outer annular surface of the second friction member is in frictional engagement with the surface of the sleeve for more than 180 degrees of the sleeve over a second arc length. The second arc length is different than the first arc length.

In one example, the chain guide assembly has a surface that faces the movable member and an annular wall extending away from the surface. The annular wall has a slot that extends through the annular wall. The friction member is positioned around the annular wall, and the first end of the friction member is positioned within the slot through the annular wall.

In one example, the biasing device is radially inner relative to the friction member.

In one example, the friction member is a spring having less than a single coil.

In one example, a damper assembly for a bicycle rear derailleur is positionable between a movable member of the bicycle rear derailleur and a chain guide assembly rotatably connected to the movable member. The damper assembly is operable to apply a damping force to the chain guide assembly when the chain guide assembly rotates in a rotational direction relative to the movable member. The damper assembly includes an annular friction member having a first end and an outer annular surface, and a sleeve that is attachable to the movable member. The first end of the annular friction member is non-rotatably attachable to the chain guide assembly. The sleeve has an inner annular surface. The outer annular surface of the annular friction member is in frictional engagement with the inner annular surface of the sleeve.

In one example, the sleeve is made of a first material, and the annular friction member is made of a second material. The first material has a greater hardness than the second material.

In one example, the outer annular surface of the annular friction member is in frictional engagement with the inner annular surface of the sleeve for more than 180 degrees of the sleeve over a first arc length.

In one example, the annular friction member is a spring having less than a single coil.

In one example, the annular friction member is a first annular friction member. The damper assembly further includes a second annular friction member having a first end and an outer annular surface. The first end of the second annular friction member is non-rotatably attachable to the chain guide assembly. The outer annular surface of the second annular friction member is in frictional engagement with the inner annular surface of the sleeve.

In one example, the outer annular surface of the second annular friction member is in frictional engagement with the inner annular surface of the sleeve for more than 180 degrees of the sleeve over a second arc length. The second arc length is different than the first arc length.

In one example, the annular friction member is made of a first type of steel, and the sleeve is made of a second type of steel.

In one example, the annular friction member is bent non-circumferentially at the first end.

In one example, a chain guide assembly for a bicycle rear derailleur is rotatably connectable to a movable member of the bicycle rear derailleur. The chain guide assembly includes a damper device attachment portion extending away from a surface of the chain guide assembly. The damper device attachment portion being configured to rotatably fix an end of a damper device disposed between the chain guide assembly and the movable member, relative to the chain guide assembly.

In one example, the damper device attachment portion includes an annular wall extending away from the surface. The annular wall having a slot that extends through the annular wall. The damper device is positionable around the annular wall, and the first end of the damper device is positionable within the slot through the annular wall.

In one example, the chain guide assembly further includes a rigid plate. The surface of the chain guide assembly is a surface of the rigid plate. The rigid plate and the damper device attachment portion are a single contiguous part.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
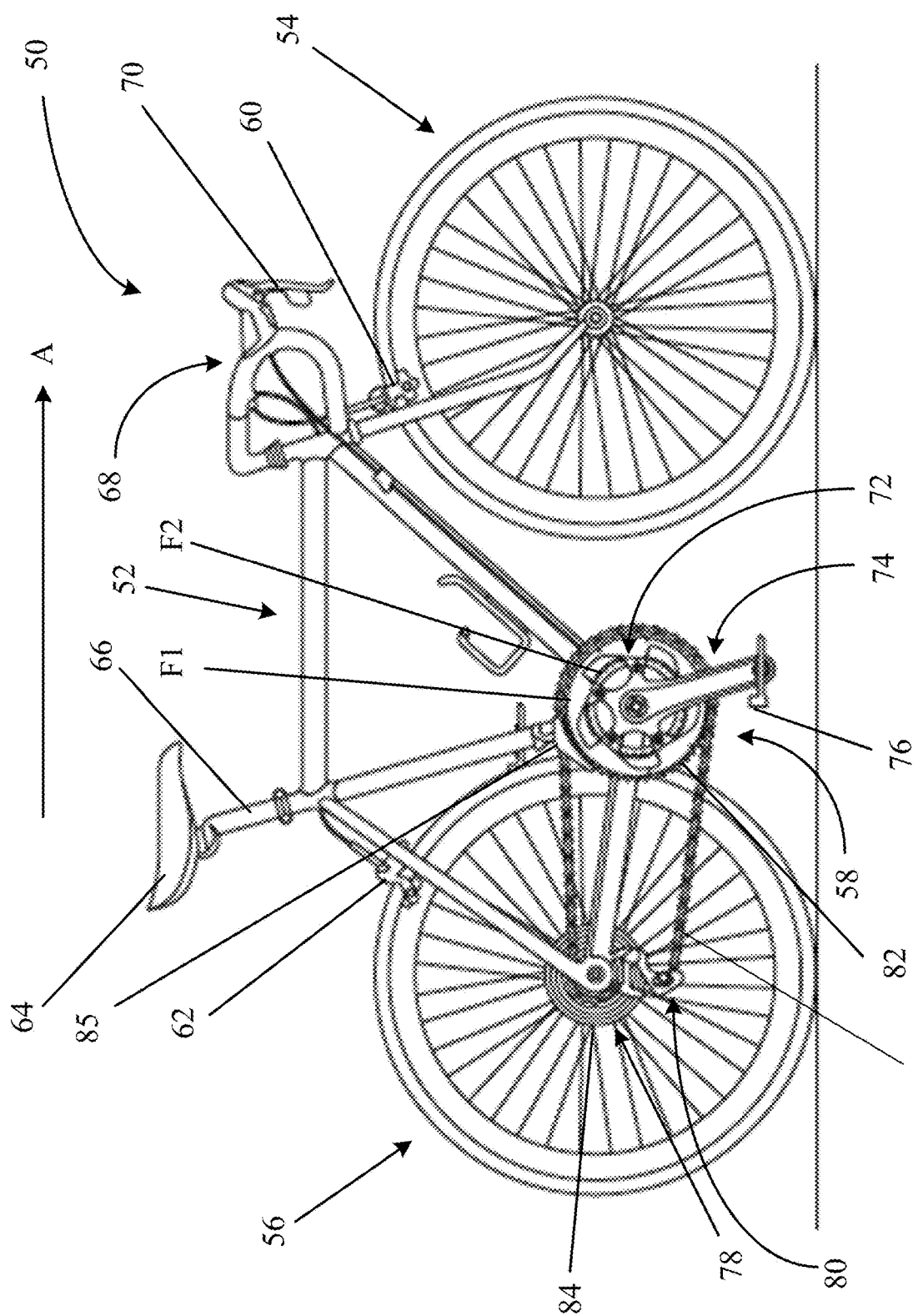
FIG. 1 is a side view schematic of a bicycle that may be constructed to utilize a damper on the rear derailleur.

The present disclosure provides examples of friction dampers and bicycle rear derailleurs that solve or improve upon one or more of the above-noted and/or other disadvantages with prior known dampers and derailleurs. The disclosed friction dampers eliminate the need to include roller clutches in the damper. The friction damper restricts derailleur chain tensioner movement in a forward chain tensioner rotational direction and helps control a chain oscillatory amplitude (e.g., a vertical chain amplitude) of a lower half of the chain when the bicycle is subject to ground input (e.g., vertical ground input). A significant advantage of the disclosed friction dampers is that damping forces are higher when the derailleur chain tensioner is rotated in the forward chain tensioner rotational direction compared to the backward chain tensioner rotational direction. The higher damping forces in the forward chain tensioner rotational direction help limit the chain amplitude, while the lower damping forces in the backward chain tensioner rotational direction allow a return spring (e.g., a P-spring) to act on the derailleur chain tensioner and maintain chain tension without a large increase or any increase in size of the return spring. Another advantage of the disclosed friction dampers is that the damper is lighter than a traditional roller clutch based friction type damper. Yet another advantage of the disclosed dampers is the ease of manufacturing the dampers and the ease of installation within the rear derailleur.

Examples of friction dampers and bicycle rear derailleurs that employ such friction dampers are disclosed and described herein. The disclosed dampers resist chain tensioner motion in the chain slackening direction of chain tensioner rotation more than in the chain tensioning direction. In one example, the torque generated by the friction damper when the derailleur chain tensioner rotates in the chain slackening direction is greater than the torque generated by the damper when the derailleur chain tensioner rotates in the chain tensioning direction by a ratio of approximately three to one. As a result, damping torque applied by the disclosed dampers is low when a rider is shifting gears, and is high during, for example, an impact or vibration situation.

The disclosed friction dampers can reduce the weight of a rear derailleur equipped with such a damper, compared to a rear derailleur equipped with a prior art roller clutch damper. For example, the simple and minimal part design of the disclosed friction dampers weighs less in comparison to, for example, a roller clutch based damped equivalent that includes multiple assembled components. The disclosed friction dampers can also be relatively small and may be cylindrical in shape, which, when mounted on a rear derailleur, may reduce the overall size of the rear derailleur or chain tensioner. A damper of smaller size along a rotation axis may allow for or produce more heel clearance for a rider during use when compared to existing derailleurs (e.g., roller clutch dampers). The foregoing solves or improves upon the problems of excessive weight and heel-to-derailleur contact when employing a roller clutch based friction type damper.

These and other objects, features, and advantages of the disclosed friction dampers will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 generally illustrates a bicycle 50 that employs a rear derailleur and a damper constructed in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54 and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. A brake lever 70 is carried on the handlebars 68 for actuating one of the front brake 60 or rear brake 62, or both. If the brake lever 70 actuates only one of the front brake 60 and the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A.

While the illustrated bicycle 50 depicted in FIG. 1 is a road bike having drop-style handlebars 68, the present disclosure may be applicable to bicycles of any type, including mountain bikes with full or partial suspension, as well as bicycles with mechanically controlled (e.g. cable, hydraulic, pneumatic) and non-mechanical controlled (e.g. wired, wireless) drive systems.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

Figure 2:
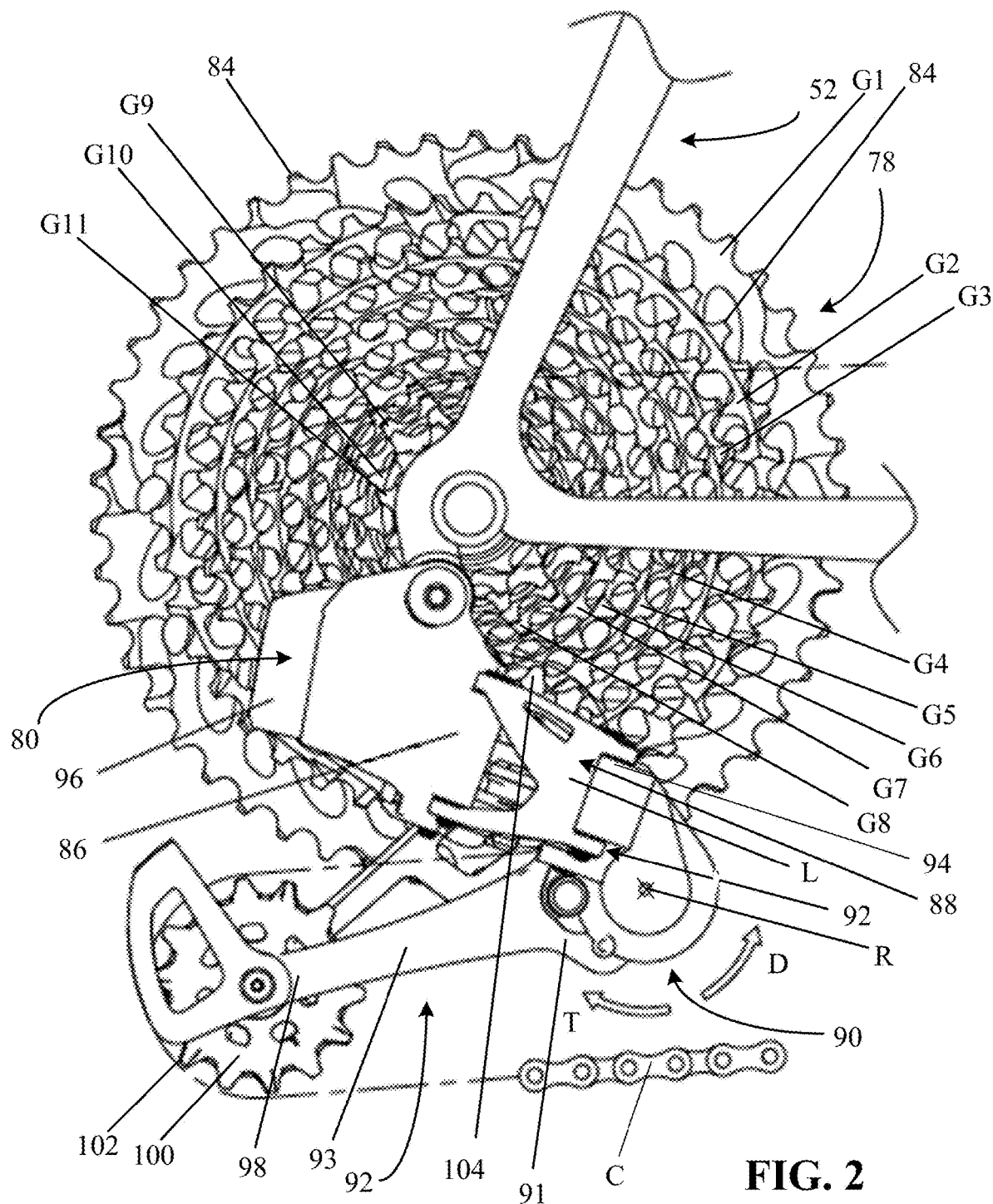
FIG. 2 is a close-up side view of one example of an electronic rear derailleur mounted to a bicycle.

As is illustrated in FIG. 1, the front sprocket assembly 72 may include one or more coaxially mounted chain rings, gears, or sprockets. In this example, the front sprocket assembly 72 has two such sprockets, F1 and F2, each having teeth 82 around a respective circumference. As shown in FIGS. 1 and 2, the rear sprocket assembly 78 may include a plurality (e.g., eleven) of coaxially mounted gears, cogs, or sprockets G1-G11. Each sprocket G1-G11 also has teeth 84 arranged around a respective circumference. The number of teeth 82 on the smaller diameter front sprocket F2 may be less than the number of teeth on the larger diameter sprocket F1. The numbers of teeth 84 on the rear sprockets G1-G11 may gradually decrease from the largest diameter rear sprocket G1 to the smallest diameter sprocket G11. Though not described in any detail herein, a front gear changer 85 may be operated to move from a first operating position to a second operating position to move the chain C between the front sprockets F1 and F2. Likewise, the rear derailleur 80 may be operable to move between eleven different operating positions to switch the chain C to a selected one of the rear sprockets G1-G11.

Figure 3:
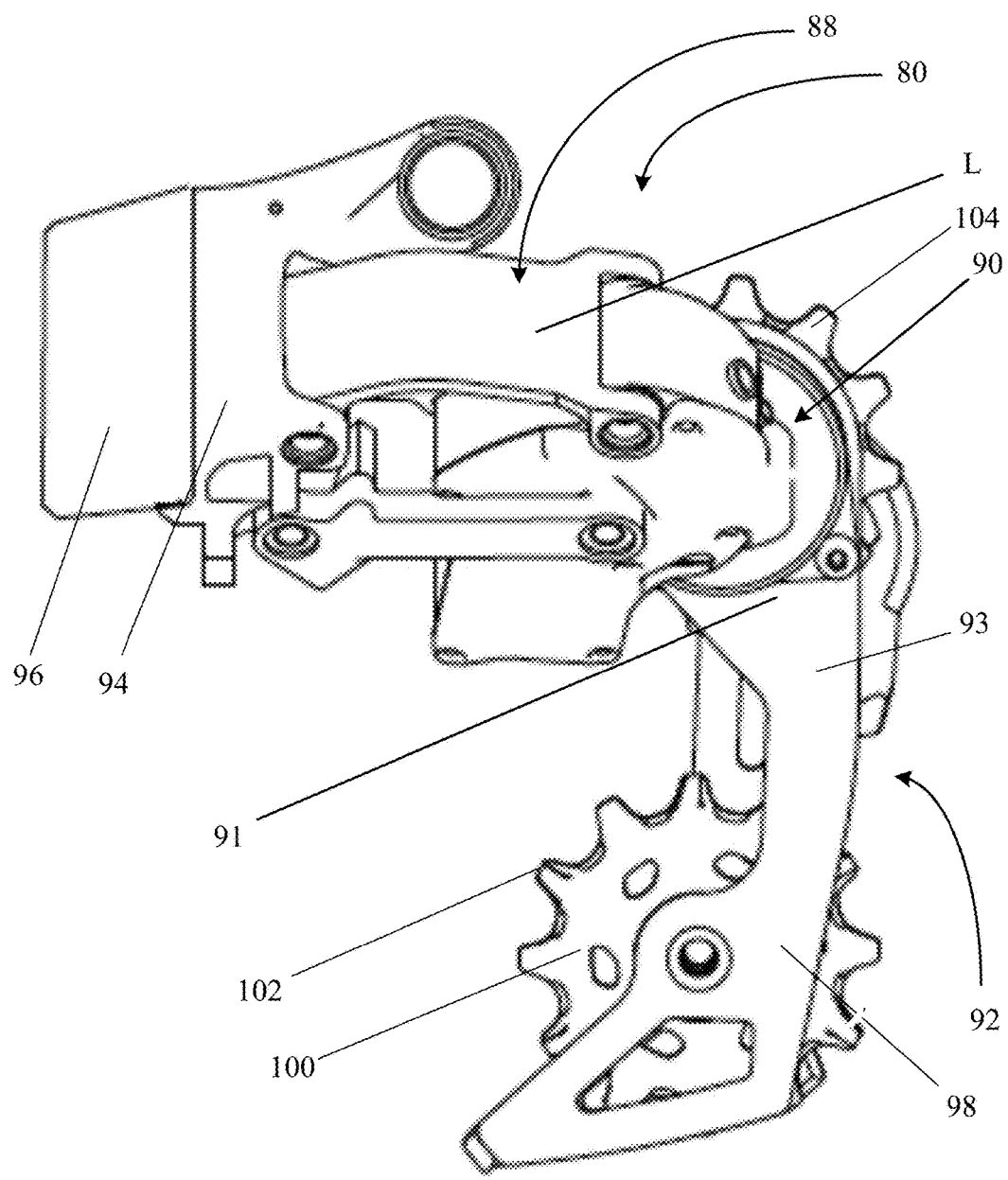
FIG. 3 is a close-up side view of another example of an electronic rear derailleur, removed from a bicycle.

Referring to FIGS. 2 and 3, the rear derailleur 80 is depicted in one example as a wireless, electrically actuated rear derailleur mounted to the frame 52 of the bicycle 50. The electric rear derailleur 80 has a base member 86 (e.g., a b-knuckle) that is mounted to the bicycle frame 52. A linkage 88 has two links L (one is hidden behind the other in FIG. 2) that are pivotally connected to the base member 86. A movable member 90 (e.g., a p-knuckle) is connected to the linkage 88. A chain guide assembly 92 (e.g., a cage) has a cage plate 93 with a proximal end 91 that is pivotally connected to a part of the movable member 90, as described further below. The cage plate 93 may rotate or pivot about a cage rotation axis R in a damping direction D and a chain tensioning direction T.

A motor module 94 is carried on the electric rear derailleur 80 and has a battery 96. The battery 96 supplies power to the motor module 94. In one example, the motor module 94 is located in the base member 86. However, the motor module 94 may instead be located elsewhere, such as in one of the links L of the linkage 88 or in the movable member 90. The motor module 94 may include, though not shown herein, a gear mechanism or transmission. As is known in the art, the motor module 94 and gear mechanism may be coupled with the linkage 88 to laterally move the cage plate 93 and thus switch the chain C among the rear sprockets G1-G11 on the rear sprocket assembly 78.

The cage plate 93 also has a distal end 98 that carries a tensioner cog or wheel 100. The wheel 100 also has teeth 102 around a circumference. The cage plate 93 is biased in the chain tensioning direction T to maintain tension in the chain C. The chain guide assembly 92 may also include a second cog or wheel, such as a guide wheel 104 disposed nearer the proximal end of the cage plate 93 and the movable member 90. In operation, the chain C is routed around one of the rear sprockets G1-G11. An upper segment of the chain C extends forward to the front sprocket assembly 72 and is routed around one of the front sprockets F1 or F2. A lower segment of the chain C returns from the front sprocket assembly 72 to the tensioner wheel 100 and is then routed forward to the guide wheel 104. The guide wheel 104 directs the chain C to the rear sprockets G1-G11. Lateral movement of the cage plate 93, tensioner wheel 100, and guide wheel 104 may determine the lateral position of the chain C for alignment with a selected one of the rear sprockets G1-G11.

Though not shown herein, a control unit may be mounted to the handlebars 68 for actuating the motor module 94 and operating the rear derailleur 80 for executing gear changes and gear selection. The control unit, however, may be located anywhere on the bicycle 50 or, alternatively, may be distributed among various components of the bicycle 50, with routing of a communication link to accommodate necessary signal and power paths. The control unit may also be located other than on the bicycle 50, such as, for example, on a rider's wrist or in a jersey pocket. The communication link may include wires, may be wireless, or may be a combination thereof. In one example, the control unit may be integrated with the rear derailleur 80 to communicate control commands between components. The control unit may include a processor, a memory, and one or more communication interfaces.

The battery 96 may instead be an alternate power supply or power source and may operate other electric components of the bicycle 50 within a linked system. The battery 96 or other power supply may also be located in other positions, such as attached to the frame 52. Further, multiple power supplies may be provided, which may collectively or individually power the electric components of the system, including the rear derailleur 80, such as a drive motor for an embodiment involving an electrically powered bicycle. In this example, however, the battery 96 is configured to be attached directly to the rear derailleur 80, and to provide power only to the components of the rear derailleur 80.

Figure 4:
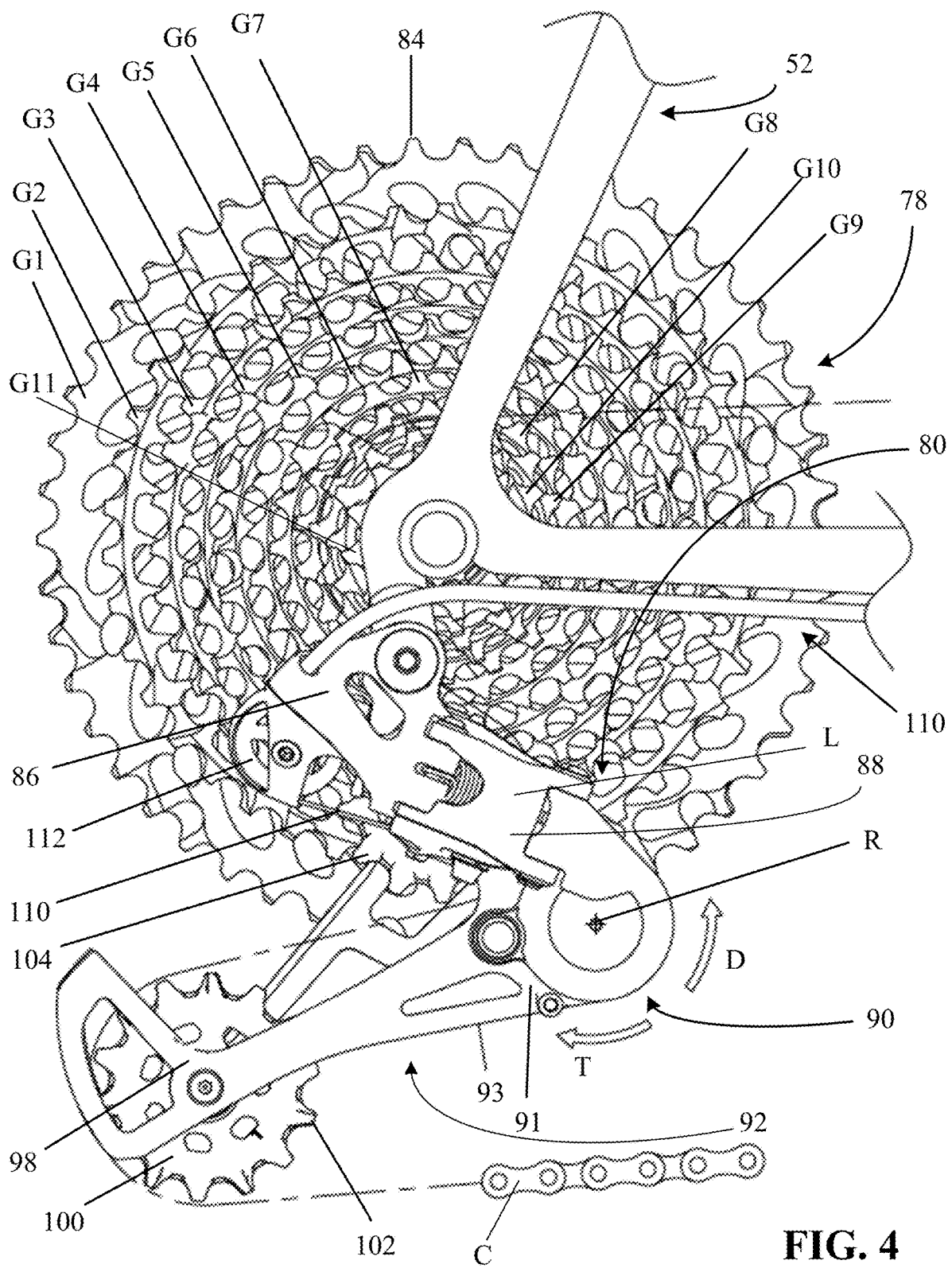
FIG. 4 is a close-up side view of one example of a manually actuated rear derailleur mounted to a bicycle.

Referring to FIG. 4, a cable actuated or manual rear derailleur 80 is shown mounted to the frame 52 of the bicycle 50. The manual rear derailleur 80 is substantially the same as the electric rear derailleur and operates in a similar manner, as described above, except for the difference noted below. Thus, the manual rear derailleur 80 includes the base member 86 mounted to the bicycle frame 52. The linkage 88, including the two links L, is pivotally connected to the base member 86. The movable member 90 is connected to the links L of the linkage 88. The cage plate 93 is pivotally connected to the movable member 90 and is rotatable about the cage rotation axis R in a damping direction D and a chain tensioning direction T. In this example, an actuator cable 110 is connected to a gear shifter (not shown) that is carried on the handlebars 68 or another part of the bicycle 50. The actuator cable 110 is routed around a cable guide wheel 112 carried by the base member 86 and is coupled to the linkage 88. A rider operates the gear shifter to move the linkage laterally to shift the chain C among the rear sprockets G1-G11, as is known in the art.

The movable member 90 houses a damper device 120, hereinafter identified as the "damper 120" to simplify the description. The damper 120 is now described referring to FIGS. 5-7. Though discussed herein as a part of a rear derailleur of a bicycle, the damper 120 may be incorporated onto a chain tensioner or chain guide assembly of a bicycle, where the chain tensioner is not a part of a front or rear derailleur.

Figure 5:
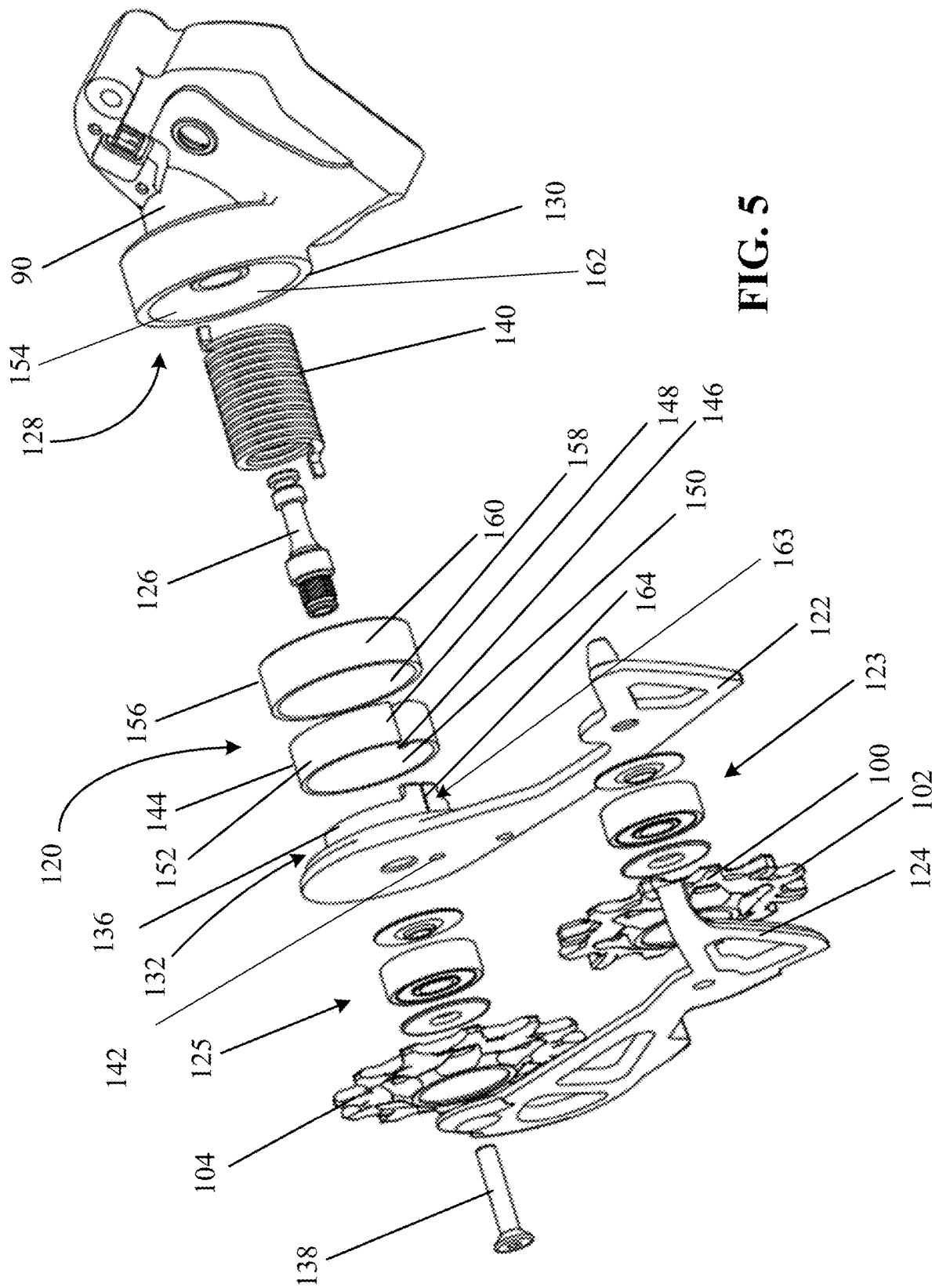
FIG. 5 is an exploded perspective view of a portion of one example of a rear derailleur, including a spring damper in accordance with the teachings of the present disclosure.
Figure 6A:
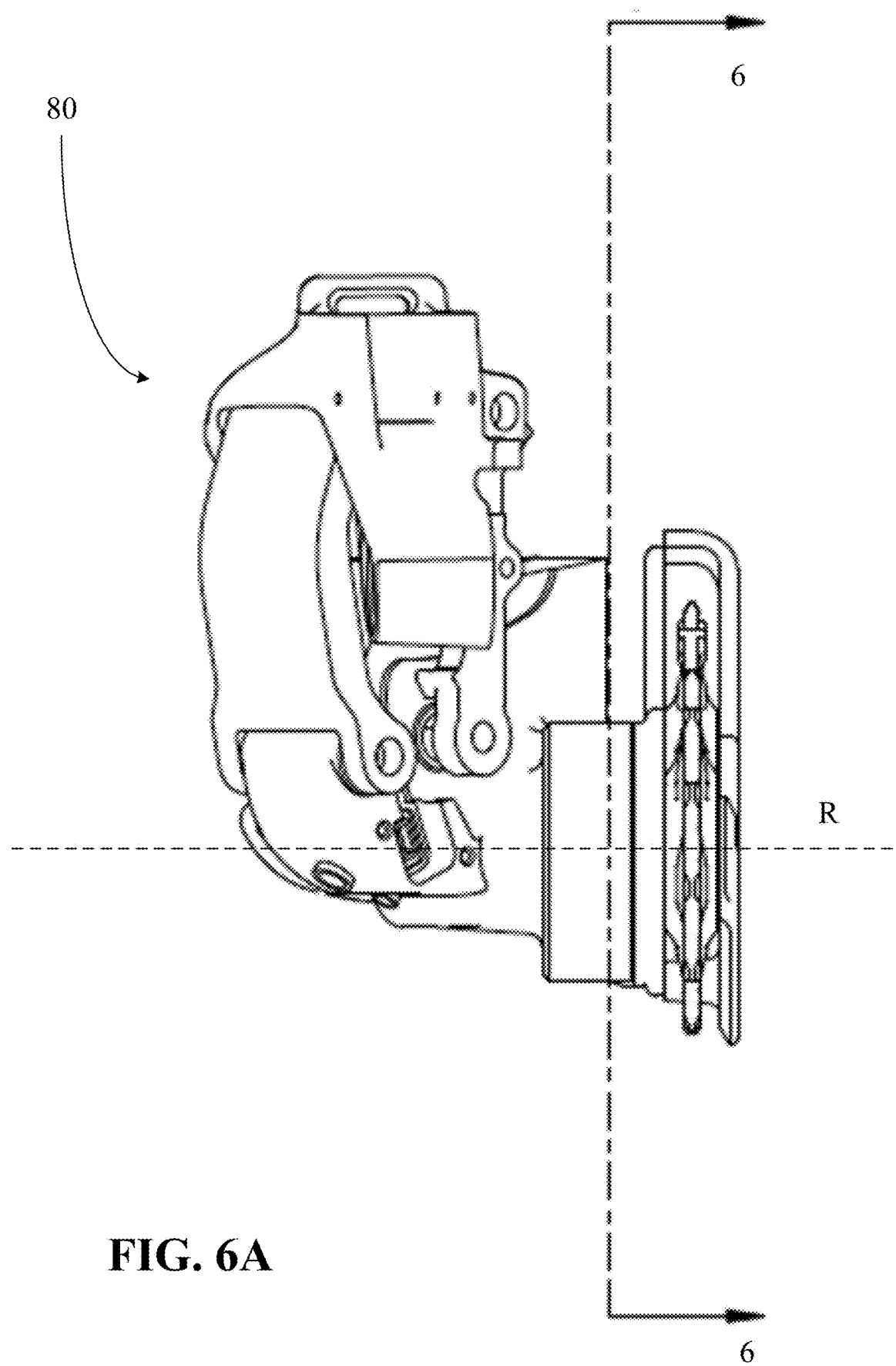
FIG. 6A is a perspective view of an example of a rear derailleur including the portion of the rear derailleur of FIG. 5, removed from a bicycle and assembled.

Referring to FIG. 5, the chain guide assembly 92 includes an outer plate 122 (e.g., the cage plate 93 in FIGS. 2-4) and an inner plate 124, spaced apart. The outer plate 122 and the inner plate 124 are, for example, rigid plates. The tensioner wheel 100 and the guide wheel 104 are rotatably arranged between the outer plate 122 and the inner plate 124 for receiving the chain (not shown). For example, the tensioner wheel 100 and the guide wheel 104 are rotatable relative to the outer plate 122 and the inner plate 124 of the chain guide assembly 92 via corresponding bearings 123 and 125, respectively, with which the tensioner wheel 100 and the guide wheel 104 rotate. The outer plate 122 is connected in a rotatably fixed manner with a rotational shaft 126. The rotational shaft 126 is supported for rotation in a cavity 128 (see FIG. 7) of the movable member 90. The cavity 128 may form a passage extending from a first axial side 130 of the movable member 90 into the movable member 90. In one example, the cavity 128 forms a passage extending from the first axial side 130 to a second axial side opposite the first axial side 130.

An intermediate member 132 (e.g., an intermediate washer) is located between the outer plate 122 and the movable member 90. The intermediate member 132 is connected to the outer plate 122 in a rotatably fixed manner by, for example, protrusions that engage in openings in the outer plate 122. In one example, the outer plate 122 and the intermediate member 132 are formed as a single contiguous part. In other words, the outer plate 122 includes a surface 134, from which an annular wall 136 extends.

The outer plate 122, including the intermediate member 132, and the inner plate 124 are connected with the rotational shaft 126 by a screw 138. The screw 138 is, for example, screwed into an inner thread of the rotational shaft 126. The screw 138 also extends through an opening through the bearing 125, such that the guide wheel 104 is rotatable about the screw 138 and/or the rotational shaft 126. For example, an inner race of the bearing 125 is rotationally fixed relative to the screw 138, and an outer race of the bearing 125, and thus the guide wheel 104, is rotatable relative to the inner race of the bearing 125.

A biasing device 140 engages with a coupling portion in a positive-locking manner in the movable member 90 (see FIG. 7) and with a coupling portion at 142, such as a hole, in a positive-locking manner in the intermediate member 132 and/or the outer plate 122. The biasing device 140 thus biases the chain guide assembly 92 in the chain tensioning direction T to maintain or restore the necessary tensioning of the chain, which is engaged with the tensioner wheel 100 and the guide wheel 104. The biasing device 140 may be any number of different types of biasing devices including, for example, a torsion spring.

In accordance with the teachings of the present disclosure, the damper 120 is disposed between the chain guide assembly 92 and the movable member 90. The damper 120 is operable to apply a damping force to the chain guide assembly 92 when the chain guide assembly rotates in the damping direction D.

The damper 120 includes a friction member 144 (e.g., an annular friction member). In one example, the friction member 144 is a spring having less than a single coil. The friction member 144 is radially outer relative to the rotational shaft 126 and the biasing device 140. In other words, the friction member 144 is positioned at respective distances relative to the rotational shaft 126 and the biasing device 140.

The friction member 144 has a first end 146, a second end 148, an inner annular surface 150, and an outer annular surface 152. The friction member 144 is positioned within the cavity 128 of the movable member 90 such that the outer annular surface 152 of the friction member 144 is in frictional engagement with (e.g., in physical contact with, abuts) an inner annular surface 154 within the cavity 128 of the movable member 90. For example, the inner annular surface 154 within the cavity 128 is sized and shaped to match or be smaller than an outer diameter, or the outer diameter and a thickness of the friction member 144. In one example, an unassembled outer diameter of the friction member 144 is larger than a diameter of the inner annular surface 154 within the cavity 128 of the movable member 90.

The size of the friction member 144 is scalable to increase or decrease frictional forces between the friction member 144 and the inner annular surface 154 within the cavity 128 during operation of the rear derailleur 80. For example, the outer diameter, the width (e.g., axial width), and/or the thickness of the friction member 144 and/or a coefficient of friction between the friction member 144 and the inner annular surface 154 within the cavity 128 may be increased or decreased to alter the frictional force capacity of the friction member 144.

In one example, the damper 120 includes an intermediate member or sleeve 156 (e.g., a ring 156) that is attachable to the movable member 90. The ring 156 has an inner annular surface 158 and an outer annular surface 160. The inner annular surface 158 of the ring 156 forms the inner annular surface 154 within the cavity 128 of the movable member 90, and the outer annular surface 152 of the friction member 144 is in frictional engagement with (e.g., physical contact with, abuts) the inner annular surface 158 of the ring 156. The inner annular surface 158 of the ring 156 is sized and shaped to match or be smaller than the outer diameter, or the outer diameter and the thickness of the friction member 144.

In one example, the movable member 90 includes a recess 162 that forms part of the cavity 128 of the movable member 90. The recess 162 is sized and shaped to match or have a smaller diameter than the outer annular surface 160 of the ring 156. The ring 156 is attached to the movable member 90 such that the ring 156 does not move relative to the movable member 90. For example, the recess 162 has a smaller diameter than an outer diameter of the ring 156, and the ring 156 is press fit into the recess 162. Additionally, the ring 156 may include texturing on the outer annular surface 160 of the ring 156 to help prevent movement of the ring 156 relative to the movable member 90. The ring 156 may be attached to the movable member 90 in any number of different ways including, for example, with an adhesive, tabs, flanges, other connectors, or any combination thereof. For example, the ring 156 may be non-rotatably attached to the movable member 90 using overmolding or keying.

In one example, the ring 156 is made of a first material, and the friction member 144 is made of a second material that is different than the first material. The first material and the second material may be any number of materials. For example, the first material is hardened steel (e.g., 4140 alloy steel), and the second material is a high carbon steel that is heat treated and spring tempered (e.g., 1080 carbon steel). Other materials may be used. The inner annular surface 158 of the ring 156 has, for example, a fine machined finish. In one example, the first material has a greater hardness than the second material, such that the friction member 144 fails before the ring 156, as the friction member 144 may be easier to replace than the ring 156 due to the non-rotatable attachment of the ring 156 relative to the movable member 90.

Grease may be used to aid in the assembly of the damper 120 including the friction member 144 and the ring 156. During operation of the rear derailleur 80, the grease included from the assembly of the damper 120 lubricates contact surfaces between the friction member 144 and the ring 156 and decreases the coefficient of static friction and the coefficient of kinetic friction compared to a damper 120 without grease between the friction member 144 and the ring 156.

The first end 146 of the friction member 144 is non-rotatably attached to the chain guide assembly 92, while the second end 148 of the friction member 144 is free to move relative to the chain guide assembly 92. For example, the second end 148 of the friction member 144 is a circumferentially free end, not fixably secured to the chain guide assembly 92 or movable member 90. The term "non-rotatably attached" includes attachment of the friction member 144 to the chain guide assembly 92 allowing backlash or play between the first end 146 of the friction member 144 and the chain guide assembly 92 (e.g., due to gaps at the connection between the first end 146 of the friction member 144 and the chain guide assembly 92). The chain guide assembly 92 includes a damper device attachment portion 163. As shown in the examples of FIGS. 5 and 6, the damper device attachment portion 163 is formed by at least a portion of the annular wall 136 extending away from the surface 134 of the outer plate 122. The annular wall 136 includes one or more openings or slots 164 (e.g., three openings or slots 164a, 164b, and 164c) that extend through the annular wall 136. The portion or portions of the annular wall 136 that form the damper device attachment portion 163 may have a greater height and/or thickness compared to the remaining portion or portions of the annular wall 136 to withstand forces on the annular wall 136 by the friction member 144.

As shown in the examples of FIGS. 5 and 6A-6C, the annular wall 136 is separated into portions 165 (e.g., three portions 165a, 165b, and 165c) defined by the three openings 164a 164b, and 164c. The portions 165 of the annular wall 136 may be the same size and/or shape, or at least one of the portions 165 may be a different size and/or shape compared to the other portions 165, as shown in the examples of FIGS. 5 and 6. Ends of each of the portions 165 of the annular wall 136 include protrusions or tabs 166 that extend towards a center of the annular wall 136 (e.g., at the cage rotation axis R). In other words, a thickness of the annular wall 136 varies, with ends of the portions 165, respectively, being thicker than the rest of the annular wall 136. The thicker ends help the annular wall 136 withstand forces on the annular wall 136 by the friction member 144.

Figure 6B:
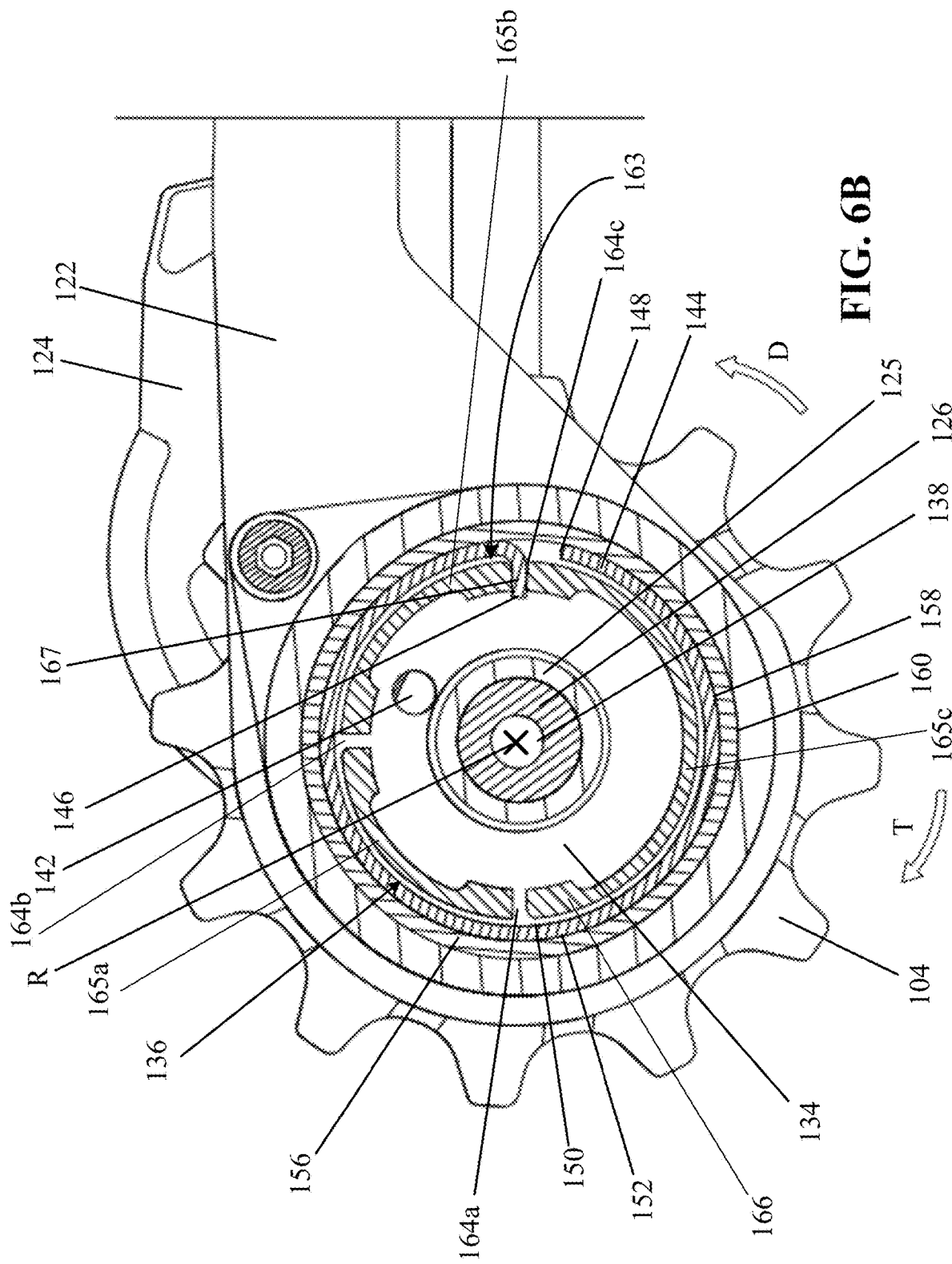
FIG. 6B is a cross-section view taken along line 6-6 and orthogonally through a rotation axis of one example of the rear derailleur of FIG. 6A.
Figure 6C:
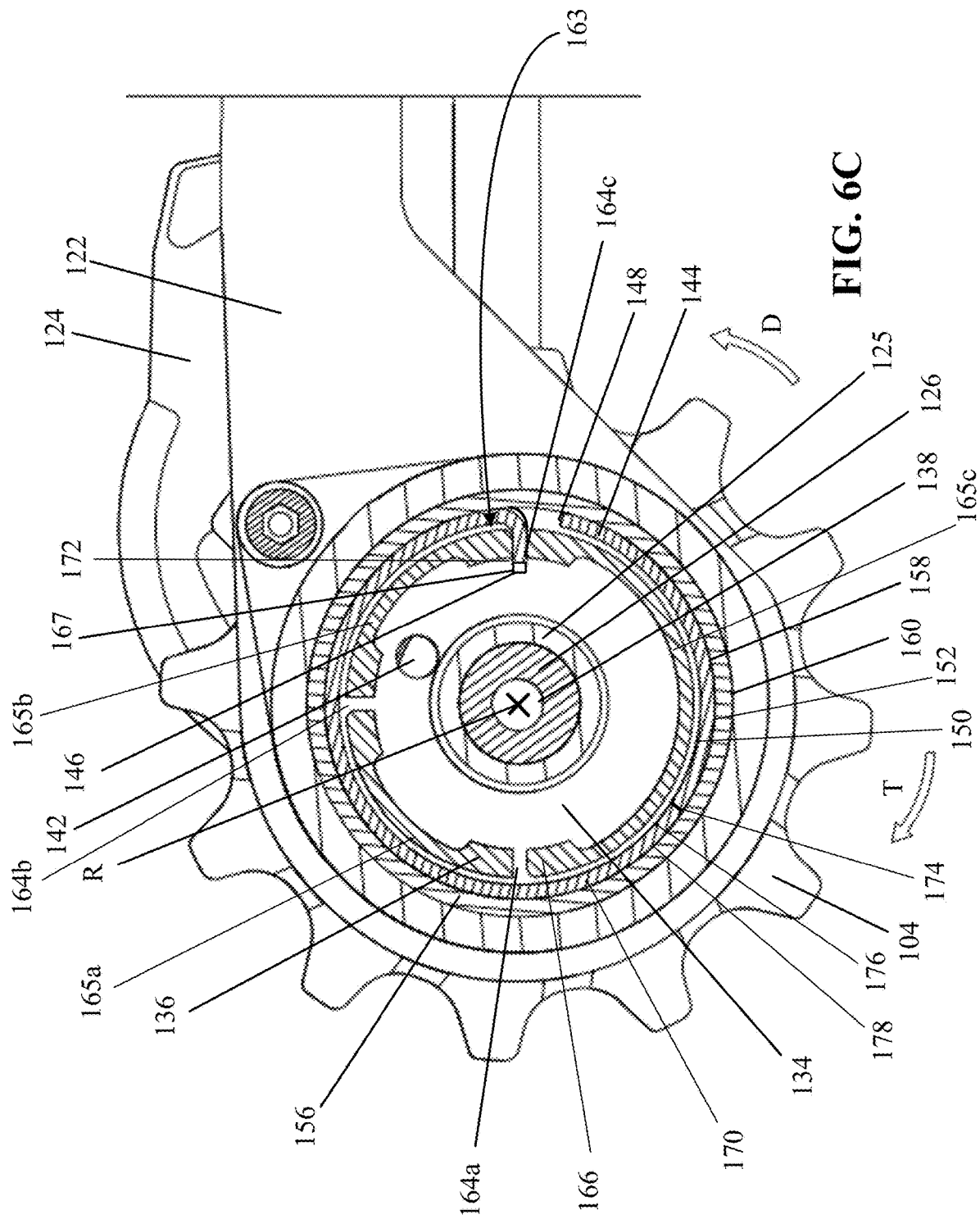
FIG. 6C is a cross-section view taken along line 6-6 and orthogonally through the rotation axis of another example of the rear derailleur of FIG. 6A.

Referring to FIG. 6B, when the rear derailleur 80 is assembled, the friction member 144 is positioned between the inner annular surface 154 of the movable member 90 (e.g., the inner annular surface 158 of the ring 156) and the annular wall 136. In FIGS. 6B and 6C, the biasing device 140 is removed, exposing the surface 134 of the outer plate 122, and the annular wall 136 that extends away from the surface 134 of the outer plate 122 is shown. The hole 142, at which the biasing device 140 engages with the chain guide assembly 92, is radially inner relative to the annular wall 136. The friction member 144 is positioned around the annular wall 136 that extends away from the surface 134 of the outer plate 122. The friction member 144 is sized and shaped such that the friction member 144 is in physical contact (e.g., frictional engagement) with the inner annular surface 158 of the ring 156, for example, but not the annular wall 136. In one example, a first portion of the friction member 144 is in physical contact (e.g., frictional engagement) with the inner annular surface 158 of the ring 156 but not in physical contact (e.g., frictional engagement) with the annular wall 136, while a second portion of the friction member 144 is in physical contact (e.g., frictional engagement) with the annular wall 136 but not in physical contact (e.g., frictional engagement) with the inner annular surface 158 of the ring 156. For example, the friction member 144, adjacent to the first end 146 (e.g., the second portion), extends away from the annular wall 136 and towards the inner annular surface 158 of the ring 156.

The friction member 144, at or adjacent to the first end 146, is positioned within, for example, a slot of the three slots 164. In the examples shown in FIGS. 6B and 6C, the slot 164 extends all of the way through the annular wall 136. In other examples, the slot 164 does not extend all of the way through the annular wall 136. In other words, the slot 164 only extends partially through the annular wall 136. A width of the slot 164 matches or is smaller than a thickness of the friction member 144. The friction member 144 is bent non-circumferentially at or adjacent to the first end 146 of the friction member 144. For example, a portion of the friction member 144, at or adjacent to the first end 146, is bent towards a center of the friction member 144. The portion of the friction member 144 forms a tab or tang 167. The shape of the tab or tang 167 helps minimize the amount of backlash that the chain guide assembly 92 travels through before engaging the friction member 144. Minimizing the backlash that the chain guide assembly 92 travels through before engaging the friction member 144 improves the effectiveness of the friction member 144 on chain displacement.

The tab or tang 167 may have a different shape than shown in FIGS. 5 and 6A-6C. The tang 167, for example, may be bent further than shown in FIG. 6B, such that the first end 146 of the friction member 144 is positioned at or adjacent to the inner annular surface 150 of the friction member 144, thus forming a circular tang. The outer plate 122 or the intermediate member 132 may include a corresponding post, about which the circular tang is positionable. In another example, at least a portion of the friction member 144 at or adjacent to the first end 146 of the friction member 144 is bent non-circumferentially in a direction away from the center of the friction member. The outer plate 122 or the intermediate member 132 includes one or more corresponding posts that extend away from the outer plate 122 or the intermediate member 132, respectively, that rotatably fix the first end 146 of the friction member 144 relative to the chain guide assembly 92.

The first end 146 of the friction member 144 may be non-rotatably attached to the chain guide assembly 92 in any number of other ways. For example, the first end 146 of the friction member 144 may be non-rotatably attached to the chain guide assembly 92 with one or more connectors such as, for example, screws, nut/bolt combinations, other tabs, flanges, and/or an adhesive.

The outer annular surface 152 of the friction member 144 is in frictional engagement with the inner annular surface 158 of the ring 156, for example, for more than 180 degrees of the ring 156 over a first arc length. For example, as discussed above, the friction member 144 may be a spring with less than a single coil, and the friction member 144 may extend around less than all of the circumference (e.g., between 180 degrees and 360 degrees) of the annular wall 136 to which the first end 146 of the friction member 144 is non-rotatably attached. In one example, the friction member 144 extends around an entirety of the extent of the circumference of the annular wall 136. In another example, the friction member 144 has more than a single coil, and the friction member 144 wraps on top of itself or the coils of the friction member 144 are positioned next to each other.

As shown in FIG. 6C, in one example, the friction member 144 is a first friction member, and the damper 120 also includes a second friction member 170. Like the first friction member 144, the second friction member 170 is, for example, a spring having less than a single coil. The second friction member 170 is positioned between the inner annular surface 154 of the movable member 90 (e.g., the inner annular surface 158 of the ring 156) and the annular wall 136 that extends away from the surface 134 of the outer plate 122. The second friction member 170 is positioned, with the first friction member 144, around the annular wall 136 that extends away from the surface 134 of the outer plate 122. The first friction member 144 and the second friction member 170 are positioned side-by-side along the height of the annular wall 136 and are both in frictional engagement with the inner annular surface 154 of the movable member 90.

The second friction member 170 has a first end 172, a second end 174, an inner annular surface 176 and an outer annular surface 178. Like the outer annular surface 152 of the first friction member 144, the outer annular surface 178 of the second friction member 170 is in frictional engagement with the inner annular surface 154 of the movable member 90. The first end 172 of the second friction member 170 is non-rotatably attached to the chain guide assembly 92, while the second end 174 of the second friction member 170 is free to move. The second friction member 170, at or adjacent to the first end 172 of the second friction member 170, is positioned within the same slot as the first end 146 of the first friction member 144. Alternatively, the second friction member 170 is positioned, at or adjacent to the first end 172 of the second friction member 170, within another slot of the three slots 164, for example.

The outer annular surface 178 of the second friction member 170 is in frictional engagement with the inner annular surface 158 of the ring 156, for example, for more than 180 degrees of the ring 156 over a second arc length. For example, the second friction member 170 may extend around less than all of the entirety of the extent of the circumference (e.g., between 180 degrees and 360 degrees) of the annular wall 136 to which the first end 172 of the second friction member 170 is non-rotatably attached.

The first arc length of the first friction member 144 and the second arc length of the second friction member 170 may be different. In such a configuration, torques provided by the first friction member 144 and the second friction member 170 are additive. Accordingly, the second friction member 170 may be used to fine-tune a resultant resistance torque on the chain guide assembly 92 created by the combination of the first friction member 144 and the second friction member 170.

The friction member 144 and, more specifically, the frictional engagement between the outer annular surface 152 of the friction member 144 and the inner annular surface 158 of the ring 156 restricts rotational motion of the chain guide assembly 92 relative to the movable member 90. When the chain guide assembly 92, with the first end 146 of the friction member 144 non-rotatably attached to the chain guide assembly 92 and the second end 148 of the friction member 144 being free, rotates in the damping direction D, the chain guide assembly 92 pushes the friction member 144 relative to and along the inner annular surface 158 of the ring 156. When the chain guide assembly 92 rotates in the tensioning direction T, the chain guide assembly 92 pulls the friction member 144 relative to and along the inner annular surface 158 of the ring 156. The friction member 144 creates a higher torque on the chain guide assembly 92 when the friction member 144 is pushed relative to and along the inner annular surface 158 of the ring 156 (e.g., when the chain guide assembly 92 rotates in the damping direction D) compared to when the friction member 144 is pulled relative to and along the inner annular surface 158 of the ring 156 (e.g., when the chain guide assembly 92 rotates in the tensioning direction T). For example, the friction member 144 may create a higher torque when the friction member 144 is pushed compared to when the friction member 144 is pulled at a ratio of three to one. Other ratios may be provided based on different sizes, shapes, and/or materials of the friction member 144 and/or the ring 156.

Figure 7A:
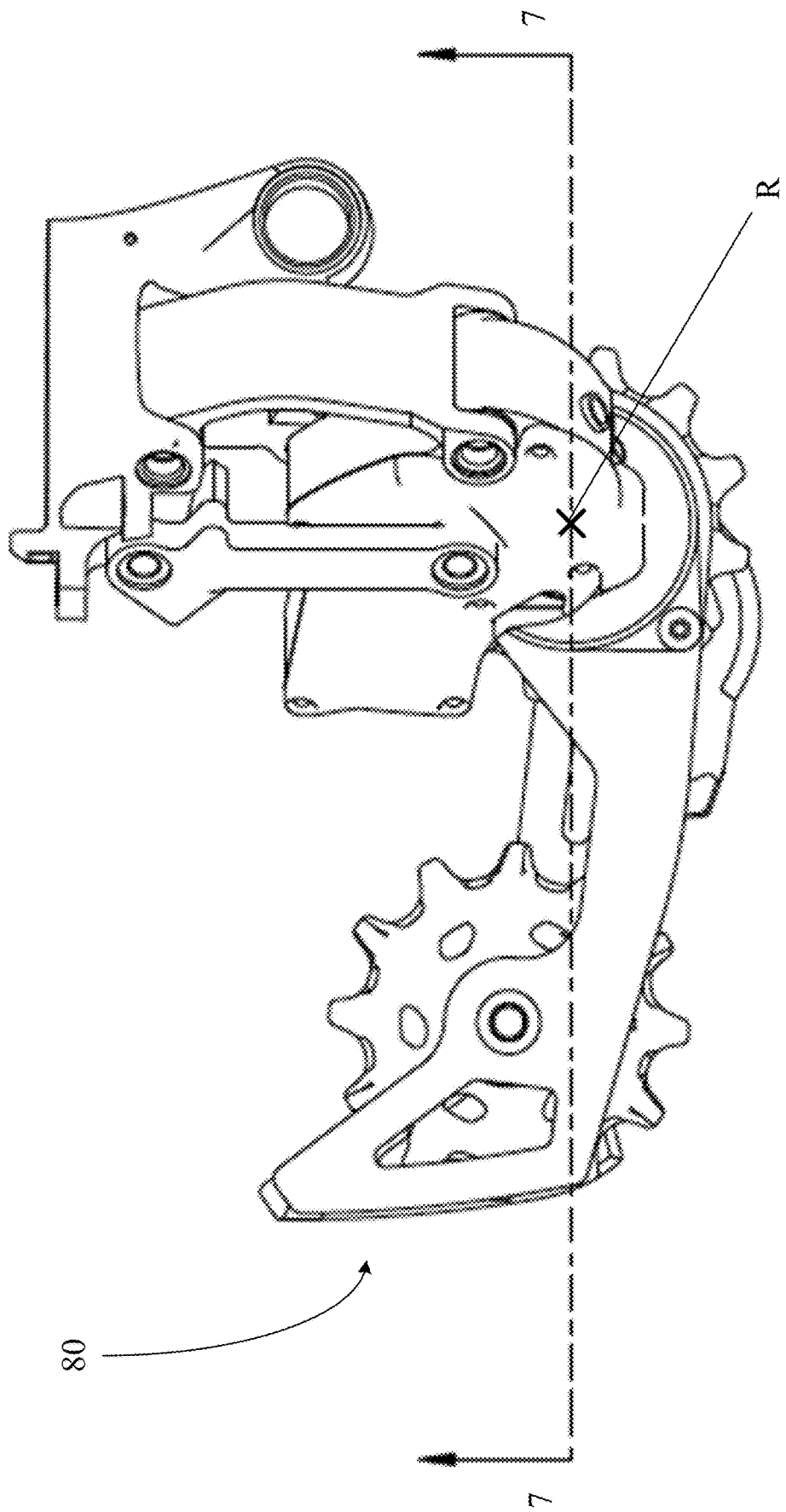
FIG. 7A is a perspective view of another example of a rear derailleur including the portion of the rear derailleur of FIG. 5, removed from a bicycle and assembled.
Figure 7B:
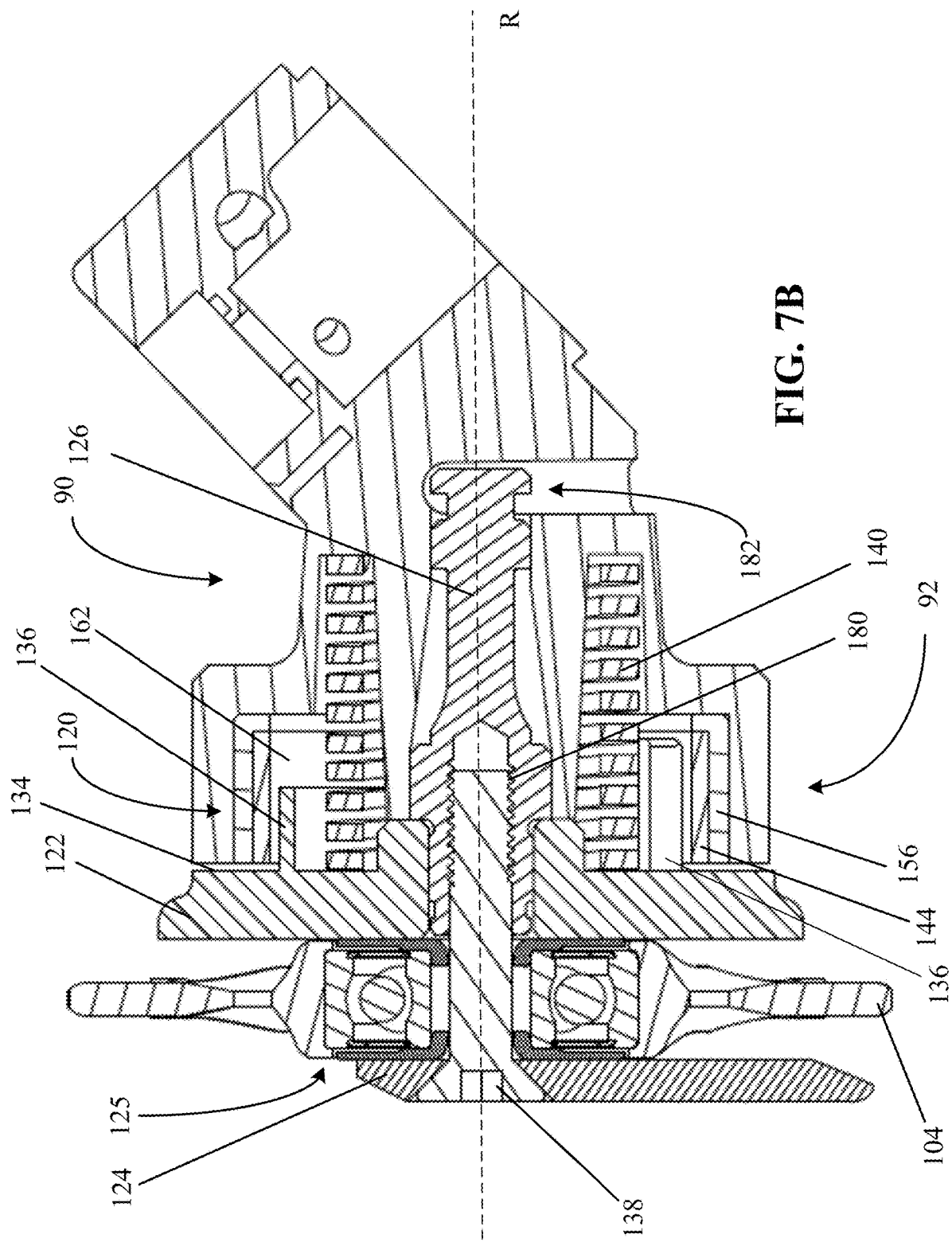
FIG. 7B is a cross-section view taken along line 7-7 and the rotation axis of one example of the rear derailleur of FIG. 7A

Referring to FIGS. 7A and 7B, the chain guide assembly 92 and the friction member 144 are rotatably attached to the movable member 90, and thus the ring 156, via the rotational shaft 126 and the screw 138. The screw 138 is, for example, screwed into an inner thread 180 of the rotational shaft 126. The rotational shaft 126 may be rotatably attached to the movable member 90 at an attachment portion 182 of the movable member 90 such that the rotational shaft 126 is not able to move translationally relative to the movable member 90, or translational movement of the rotational shaft 126 relative to the movable member 90 is minimized.

The chain guide assembly 92, including the outer plate 122 with the annular wall 136, the inner plate 124, the bearing 125, and the guide wheel 104 shown in FIG. 7B, rotates together with the friction member 144 in the damping direction D and the tensioning direction T. The biasing device 140, which biases the chain guide assembly 92 in the tensioning direction T, is radially inner relative to the friction member 144 and the ring 156, and is radially outer relative to the rotational shaft 126. As the chain guide assembly 92 rotates in the damping direction D, the biasing device 140 acts on the chain guide assembly 92 to return the chain guide assembly 92 to a rotational position in which chain tension is maintained. The lower torque created by the friction member 144 in the tensioning direction T compared to the damping direction D allows the biasing device 140 to maintain chain tension without a large increase or any increase in size of the biasing device 140 compared to a rear derailleur without the friction member 144.

The frictional engagement between the friction member 144 and the ring 156, for example, when the chain guide assembly 92 rotates in the damping direction D may limit the amount of vertical chain movement when the bicycle 50, for example, is subject to ground input. Compared to the prior art, friction members of the present embodiments are low in weight and cost to manufacture, and are easy to install within a finished bicycle. The friction members of the present embodiments also provide a relatively stable torque output range if parts (e.g., the friction member 144, the ring 156, and the annular wall 136 extending from the surface 134 of the outer plate 122) are manufactured within tolerance.

Figure 7C:
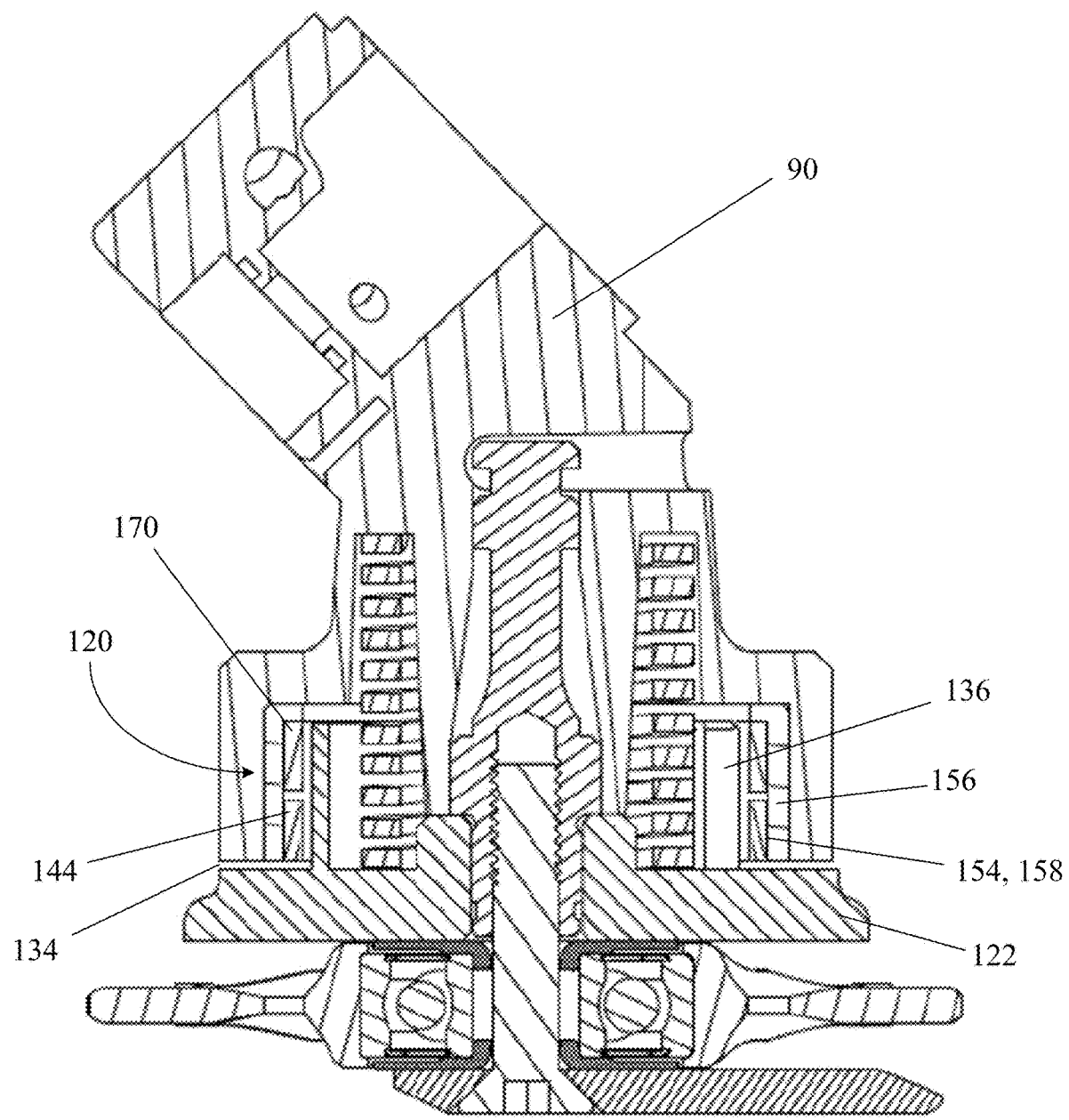
FIG. 7C is a cross-section view taken along line 7-7 and the rotation axis of another example of the rear derailleur of FIG. 7A.

As shown in FIG. 7C, in one example, the friction member 144 is a first friction member, and the damper 120 also includes a second friction member 170. Like the first friction member 144, the second friction member 170 is, for example, a spring having less than a single coil. The second friction member 170 is positioned between the inner annular surface 154 of the movable member 90 (e.g., the inner annular surface 158 of the ring 156) and the annular wall 136 that extends away from the surface 134 of the outer plate 122. The second friction member 170 is positioned, with the first friction member 144, around the annular wall 136 that extends away from the surface 134 of the outer plate 122. The first friction member 144 and the second friction member 170 are positioned side-by-side (e.g., adjacent to each other) along the height of the annular wall 136 and are both in frictional engagement with the inner annular surface 154 of the movable member 90. The second friction member 170 may have a same or different size compared to the first friction member 144. For example, the second friction member 170 may have a shorter arc length compared to the first friction member 144.

Each of the above-described examples of a friction damper illustrates that the configuration and construction of the dampers can be varied in different ways. However, other examples different from those disclosed and described herein are also possible. The invention and the disclosure are not intended to be limited to only the examples of FIGS. 1-7.

Although certain friction dampers, bicycle derailleurs, and bicycles have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A bicycle rear derailleur comprising:
   a base member mountable to a bicycle frame;
   a movable member movably coupled to the base member, the movable member having an inner annular surface;
   a chain guide assembly rotatably connected to the movable member;
   a biasing device configured to bias the chain guide assembly in a first rotational direction relative to the movable member;
   a damper device disposed between the chain guide assembly and the movable member, the damper device operable to apply a damping force to the chain guide assembly when the chain guide assembly rotates in a second rotational direction relative to the movable member, the second rotational direction being opposite the first rotational direction, the damper device comprising:
      a friction member having an outer annular surface, the outer annular surface of the friction member being in frictional engagement with the inner annular surface of the movable member, the friction member having a first end, the first end of the friction member being non-rotatably attached to the chain guide assembly, the friction member also having a second end, the second end of the friction member being circumferentially free.

2. The bicycle rear derailleur of claim 1, further comprising a shaft, the chain guide assembly being rotatably connected to the movable member via the shaft,
   wherein the friction member is disposed a radial distance from the shaft.

3. The bicycle rear derailleur of claim 1, further comprising a sleeve,
   wherein the movable member has an annular recess, the sleeve being attached to the movable member within the annular recess such that the sleeve does not rotate relative to the movable member, and
   wherein a surface of the sleeve forms the inner annular surface of the movable member.

4. The bicycle rear derailleur of claim 3, wherein the sleeve is made of a first material, and the friction member is made of a second material, the first material having a greater hardness than the second material.

5. The bicycle rear derailleur of claim 3, wherein the outer annular surface of the friction member is in frictional engagement with the surface of the sleeve for more than 180 degrees of the sleeve over a first arc length.

6. The bicycle rear derailleur of claim 5, wherein the friction member is a first friction member,
wherein the damper device further comprises a second friction member having a first end and an outer annular surface, the first end of the second friction member being non-rotatably attached to the chain guide assembly, and
wherein the outer annular surface of the second friction member is in frictional engagement with the surface of the sleeve.

7. The bicycle rear derailleur of claim 6, wherein the outer annular surface of the second friction member is in frictional engagement with the surface of the sleeve for more than 180 degrees of the sleeve over a second arc length, the second arc length being different than the first arc length.

8. The bicycle rear derailleur of claim 1, wherein the chain guide assembly has a surface that faces the movable member and an annular wall extending away from the surface, the annular wall having a slot that extends through the annular wall, and
wherein the friction member is positioned around the annular wall, and the first end of the friction member is positioned within the slot through the annular wall.

9. The bicycle rear derailleur of claim 1, wherein the biasing device is radially inner relative to the friction member.

10. The bicycle rear derailleur of claim 1, wherein the friction member is a spring having less than a single coil.

11. A damper assembly for a bicycle rear derailleur, the damper assembly being positionable between a movable member of the bicycle rear derailleur and a chain guide assembly rotatably connected to the movable member, and being operable to apply a damping force to the chain guide assembly when the chain guide assembly rotates in a rotational direction relative to the movable member, the damper assembly comprising:
an annular friction member having a first end and an outer annular surface, the first end of the annular friction member being non-rotatably attachable to the chain guide assembly; and
a sleeve that is attachable to the movable member, within a recess of the movable member, the sleeve having an inner annular surface,
wherein the outer annular surface of the annular friction member is in frictional engagement with the inner annular surface of the sleeve, wherein the annular friction member is a spring having less than a single coil.

12. The damper assembly of claim 11, wherein the sleeve is made of a first material, and the annular friction member is made of a second material, the first material having a greater hardness than the second material.

13. The damper assembly of claim 12, wherein the outer annular surface of the annular friction member is in frictional engagement with the inner annular surface of the sleeve for more than 180 degrees of the sleeve over a first arc length.

14. The damper assembly of claim 13, wherein the annular friction member is a first annular friction member,
wherein the damper assembly further comprises a second annular friction member having a first end and an outer annular surface, the first end of the second annular friction member being non-rotatably attachable to the chain guide assembly, and
wherein the outer annular surface of the second annular friction member is in frictional engagement with the inner annular surface of the sleeve.

15. The damper assembly of claim 14, wherein the outer annular surface of the second annular friction member is in frictional engagement with the inner annular surface of the sleeve for more than 180 degrees of the sleeve over a second arc length, the second arc length being different than the first arc length.

16. The damper assembly of claim 11, wherein the annular friction member is made of a first type of steel, and the sleeve is made of a second type of steel.

17. The damper assembly of claim 11, wherein the annular friction member is bent non-circumferentially at the first end.

* * * * *